United States Patent

[11] 3,619,202

[72] Inventor  Alfred H. Bellows
                Cambridge, Mass.
[21] Appl. No. 45,417
[22] Filed    June 11, 1970
[45] Patented Nov. 9, 1971
[73] Assignee Polaroid Corporation
                Cambridge, Mass.

[54] VARIABLE FRAME VIEWFINDER FOR PHOTOGRAPHIC CAMERA
    12 Claims, 4 Drawing Figs.
[52] U.S. Cl. .................................................. 95/44 C,
                                                              88/1.5
[51] Int. Cl. ..................................................... G03b 3/00
[50] Field of Search .......................................... 95/44 R, 44
                                                              C; 88/1.5

[56]             References Cited
              UNITED STATES PATENTS
2,719,454  11/1955  Nerwin ......................... 95/44 C
3,029,720   4/1962  Leitz et al. .................... 95/44 C
3,212,422  10/1965  Nerwin et al. ................   95/44

Primary Examiner—Samuel S. Matthews
Assistant Examiner—E. M. Bero
Attorneys—Brown and Mikulka, William D. Roberson and Frederick H. Brustman ABSTRACT: A photographic camera has a variable focus objective lens and a novel variable frame viewfinder coupled to the focus control mechanism for the objective lens. The viewfinder includes a plurality of discrete reticles respectively defining linear framing marks, and a corresponding plurality of anamorphic reticle imaging means, one associated with each of the reticles, for projecting virtual images of the respectively associated framing marks into the viewed field. The reticles and associated reticle means are positioned in associated pairs oriented to establish respective reticle projection axes diverging into the field from a viewfinder viewing location such that the virtual images of the framing marks cooperate when viewed in composite to frame a portion of the field. The anamorphic reticle imaging means are each disclosed as comprising a cylindrical lens having an axis of zero power aligned with a slitlike window defined by the reticle, each of the lenses being positioned at most a focal length away from the associated window. Frame varying means coupled to the focus control mechanism causes the framed portion of the scene to vary in accordance with a predetermined program so as to compensate for sighting parallax errors and field size changes.

INVENTOR
ALFRED H. BELLOWS

BY Brown and Mikulka
and
John H. Coull
ATTORNEYS

PATENTED NOV 9 1971 3,619,202

INVENTOR
ALFRED H. BELLOWS

BY Brown and Mikulka
and
John H. Coult
ATTORNEYS

VARIABLE FRAME VIEWFINDER FOR PHOTOGRAPHIC CAMERA

CROSS-REFERENCE TO RELATED APPLICATION

This application relates to a copending application of Edwin H. Land, Ser. No. 45418, filed June 11, 1970 assigned to the assignee of the subject invention.

BACKGROUND OF THE INVENTION

The above-referenced copending application describes and claims in a broad sense the concept of an extremely compact coupled variable frame viewfinder comprising a plurality of reticles each defining a framing mark and a corresponding plurality of respectively associated reticle imaging means for projecting virtual images of the framing marks into the viewed field. As described in the said copending application the viewfinder projects a brilliant and substantially undistorted frame image to infinity in the viewed field. The field is presented in natural brightness and full size.

The invention is directed to an improvement of one aspect of the novel viewfinder concept set forth in the said copending application—more specifically, to an improved reticle and reticle imaging means.

OBJECTS OF THE INVENTION

It is an object of this invention to provide an improved viewfinder of the type described above which is capable of projecting a plurality of framing mark images which when viewed in composite, outline a substantially unbroken rectilinear frame.

It is another object of this invention to provide a viewfinder coupled to a focus control mechanism of a photographic camera such that the framed portion of the viewed field is varied to compensate for sighting parallax errors and field size changes which result from adjustments in the focus of the camera objective.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

BRIEF DESCRIPTION OF THE PREFERRED EMBODIMENTS

Figure 1:
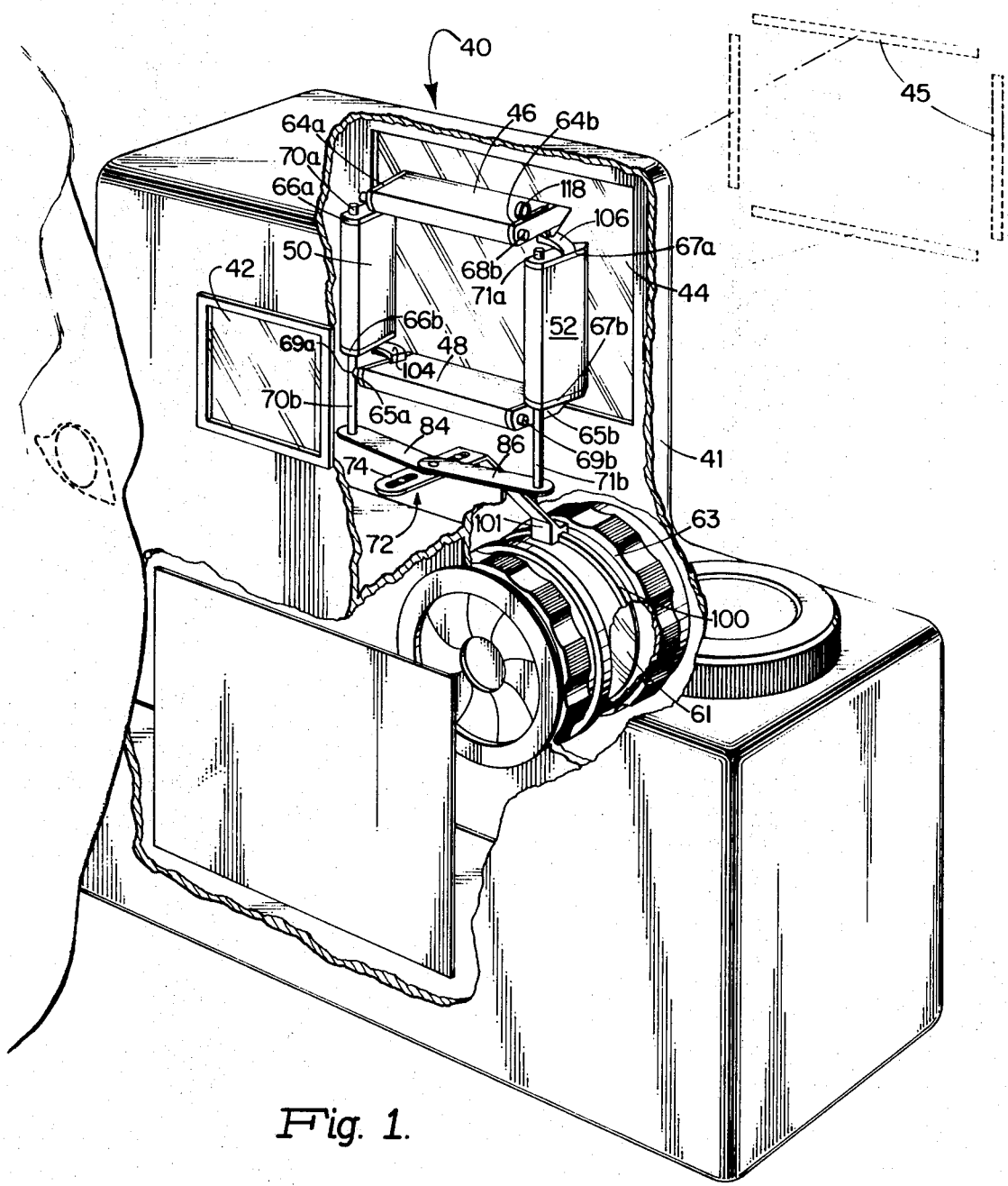
FIG. 1 is a perspective view of a photographic camera incorporating a novel rangefinder embodying the teachings of this invention.
Figure 2:
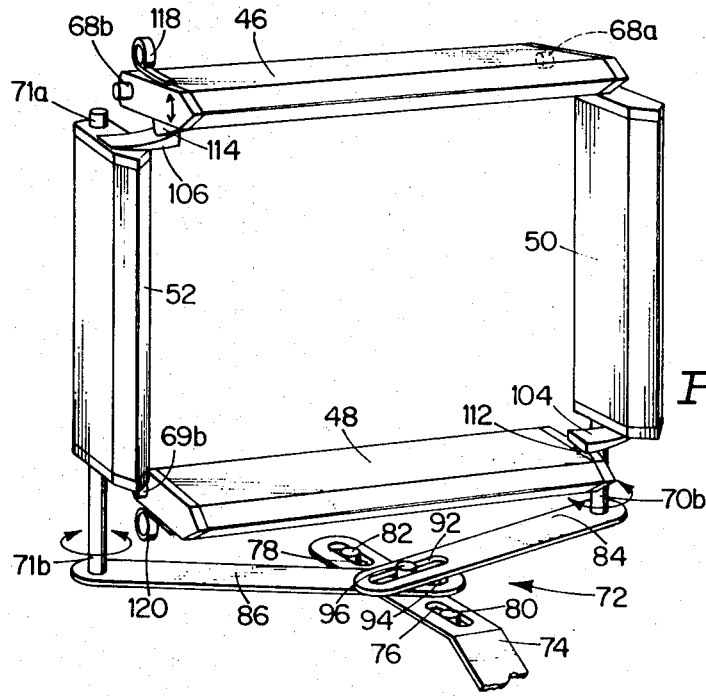
FIG. 2 is an enlarged fragmentary front perspective view of the viewfinder of FIG. 1.
Figure 3:
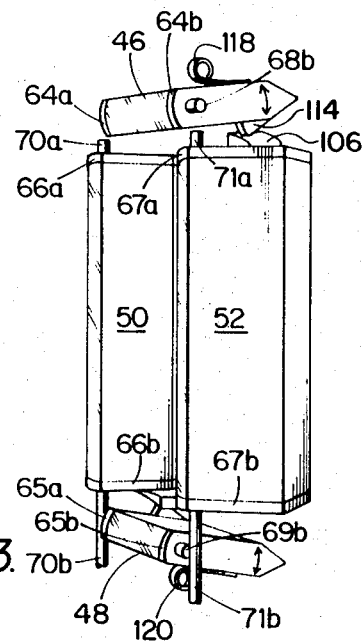
FIG. 3 is a side perspective view of a portion of the viewfinder shown in FIG. 2.
Figure 4:
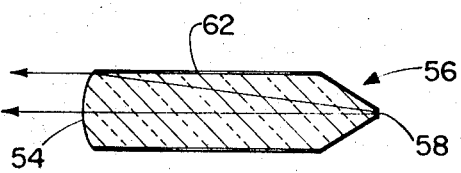
FIG. 4 is a sectional view of one of the anamorphic lenses shown in FIGS. 1–3.

The drawings illustrate but one of the many possible implementations of the principles of this invention. FIG. 1 shows a photographic camera incorporating a novel viewfinder 40 constructed according to this invention. In the illustrated embodiment the viewfinder 40 comprises a housing 41 having a viewing window 42 in the rear wall thereof and a front window 44 across the front of the housing 40. The viewfinder is shown as including four reticles and a like number of associated anamorphic reticle imaging means for respectively projecting to infinity linear framing mark images, sometimes herein termed frame lines 45, which collectively define a highly luminous rectilinear frame. The frame lines are designated at 45. Numerous structures may be devised within the compass of this invention for creating the said frame lines. The illustrated embodiment teaches the use of four glass prisms 46, 48, 50, and 52. The prisms each have a longitudinal axis of zero power, and orthogonal thereto, an axis of substantial positive power. As shown in FIG. 4, the optical power is provided by curved rear surfaces 54 on the prisms. The curved surfaces 54 may, for example, be cylindrical as shown or elliptical.

The prisms 46, 48, 50, and 52 each have a beveled forward end 56 truncated to form an apex surface 58. The prisms are shown as each being masked, as by an opaque coating 60, on all surfaces thereof except the curved rear surface 54 and the apex surface 58. The coating 60 surrounds the the apex surface 58 of each prism to define a linear framing mark in the form of a slitlike window which admits ambient light to the viewer. The apex surfaces 58 are preferably frosted or otherwise caused to be light scattering in order to remove any imagery from the windows. The virtual images of the windows herein called frame lines 45 formed by the described cylindrical lenses will appear bright against scene backgrounds at normal levels of ambient illumination.

The front-to-back width of each of the prisms is equal to or somewhat less than the focal length of the curved prism rear surface in order that the frame lines 45 are projected substantially to infinity. An observer looking into a field through the viewfinder will see four orthogonally arranged frame lines collectively framing a rectangular area of the field.

As stated above, it is an object of this invention to provide a coupled photographic viewfinder having a variable frame responsive to adjustments in the focus of the camera objective lens in such a way as to cause the frame size and location to vary to compensate for field size changes and sighting parallax errors.

In the disclosed embodiment a photographic camera incorporating the viewfinder 40 is illustrated schematically as having a variable focus objective lens 61 forming part of an assembly 63 which may also include shuttering and aperture control structure (not shown specifically).

To vary the frame size and location, each of the prisms is caused to rotate about an axis parallel to its longitudinal axis. The axis of rotation is preferably located as close as possible to the viewing window 42 in order to minimize vignetting as the prisms are rotated.

The prisms 46, 48, 50, and 52 are shown as being held by respective pairs of end caps 64a and 64b, 65a and 65b, 66a and 66b, 67a and 67b. The end caps respectively support shafts 68a and 68b, 69b (left side shaft not shown), 70a and 70b, 71a and 71b, mounted for rotation in bearings supported by the viewfinder housing 41.

In order that the frame lines may be moved in concert according to a predetermined program to compensate for field size changes and sighting parallax errors accompanying adjustments in focus of the objective lens 61, frame varying means are provided. In the disclosed embodiment the frame varying means is illustrated as including a linkage 72 responsive to axial movement of the lens assembly 63 which acts to rotate the prisms 50, 52 in opposite directions. The lens assembly 63 is shown as being of the type wherein rotation of the assembly causes the assembly to move along the axis thereof.

The illustrated linkage 72 includes a slide 74 constrained to linear motion by the effect of a pair of grooves 76, 78 which capture a pair of pins 80, 82 mounted on the camera housing. A pair of arms 84, 86 are affixed to the ends of shafts 70b, 71b supporting prisms 50, 52 and have slots 92, 94 receiving a pin 96 on slide 74. By this arrangement the shafts 70b, 71b are caused to rotate in exact correspondence with the rotation of arms 84, 86.

The lens assembly has a cam 100 which drives a cam follower 101 on the slide 74 to cause the vertical frame lines established by prisms 50, 52 to approach or depart. In order that the upper and lower prisms 46, 48 may be caused to move with the prisms 50, 52 there are provided axial cams 104, 106 affixed to the end caps 66b, 67a on prisms 50, 52 which drive cam followers 112, 114 on end caps 65a and 64b. A tensioning bias is provided by a first leaf spring 118 acting on end cap 64b and a second leaf spring 120 (not shown) acting on end cap 65b. By appropriate selection of the screw drive for assembly 63, adjustment of the focus of the lens by rotation of the assembly 63 to focus on closer objects (i.e., by moving the lens 14 toward the subject) will cause the frame to collapse inwardly, defining a smaller recordable field of view.

The axial cams 104, 106 are profiled such as to cause the upper and lower frame lines 45 to follow a predetermined program effective to compensate for field size changes and sighting errors. The movement program is designed such that the framed portion of the scene observable by the viewer decreases in size and lowers in position as objects nearer the photographer are brought into focus by adjustments in the axial position of the camera objective. The predetermined frame variation program is, of course, tailored to the particular camera in which the viewfinder is incorporated; however, the general program of decreasing size to compensate for field size changes and descending position for closer objects (to compensate for sighting parallax errors) will necessarily be followed in all applications.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. For use in a photographic camera, a viewfinder for visibly framing a portion of a viewed field, comprising:
   a plurality of discrete reticle means respectively defining linear framing marks;
   a corresponding plurality of anamorphic reticle imaging means, one associated with each of said reticle means, each reticle imaging means projecting a virtual image of the associated framing mark into the viewed field; and
   means for positioning said reticle means and said reticle imaging means in associated pairs to establish respective reticle projection axes diverging into the field from a viewfinder viewing location such that said virtual images of said framing marks cooperate when viewed in composite to frame a portion of the field.

2. The apparatus defined by claim 1 wherein said reticle means each comprise a mask defining a slitlike light-transmitting window defining the configuration of the respective framing mark.

3. The apparatus defined by claim 2 wherein said anamorphic reticle imaging means each comprise an anamorphic lens having an axis of zero power aligned with the respective mask window and an axis of substantial power extending into the field, each of said lenses being positioned at most a focal length away from the respective window.

4. The apparatus defined by claim 3 wherein each of said anamorphic lenses comprises a glass prism having a forward apex line and a curved rear surface, said mask means comprising means on said prism for preventing light from entering said prism except along said apex line to thereby define said slitlike windows.

5. The apparatus defined by claim 4 wherein said curved rear surface of each of said prisms is cylindrical.

6. For use in a photographic camera, a viewfinder for visibly framing a portion of a viewed field, comprising:
   means providing a view of a field;
   a plurality of discrete reticle means respectively defining framing marks;
   a corresponding plurality of anamorphic reticle imaging means, one associated with each of said reticle means, for projecting into the viewed field virtual images of the associated framing marks which take the form of frame lines; and
   means for positioning the associated pairs of reticle means and reticle imaging means around the periphery of the viewed field such that said frame lines collectively frame a generally rectangular area of the field.

7. For use in a photographic camera, a viewfinder for visibly framing a portion of a viewed field, comprising:
   four discrete reticle means respectively defining linear framing marks;
   four reticle imaging means, one associated with each of said reticle means, for projecting into the viewed field virtual images of the associated framing marks which take the form of frame lines; and
   means for positioning the associated pairs of reticle means and said associated reticle imaging means such that said virtual images of said framing marks are separated in the field and collectively mark the horizontal and vertical boundaries of a generally rectangular area of the field.

8. In a photographic camera having a variable focus objective lens and focus control means for adjusting the focus of said objective lens, a variable frame viewfinder for visibly framing a variable portion of a viewed field, comprising:
   a plurality of discrete reticle means respectively defining framing lines;
   a corresponding plurality of anamorphic reticle imaging means, one associated with each of said reticle means, each reticle imaging means projecting a virtual image of the associated framing line into the viewed field;
   means for positioning said reticle means and said reticle imaging means in associated pairs to establish respective reticle projection axes diverging into the field from a viewfinder viewing location such that said virtual images of said framing lines cooperate when viewed in composite to frame a rectilinear portion of the viewed field; and
   frame varying means coupled to at least one pair element of each of said associated pairs of reticle means and reticle imaging means and responsive to adjustments in said focus control means for collectively translating said images of said framing lines to vary according to a predetermined program the size of the portion of the field framed thereby.

9. The apparatus defined by claim 8 wherein said reticle means each comprise a mask defining a slit-line light-transmitting window defining the configuration of the respective framing mark.

10. The apparatus defined by claim 9 wherein said anamorphic reticle imaging means each comprise an anamorphic lens having an axis of zero power aligned with the respective mask window and an axis of substantial power extending into the field, each of said lenses being positioned at most a focal length away from the respective window.

11. The apparatus defined by claim 10 wherein each of said anamorphic lenses comprises a glass prism having a forward apex line and a curved rear surface, said mask means comprising means on said prism for preventing light from entering said prism except along said apex line to thereby define said slitlike windows.

12. The apparatus defined by claim 11 wherein said curved rear surface of each of said prisms is cylindrical.

* * * * *